(12) United States Patent
Yang et al.

(10) Patent No.: US 7,850,021 B2
(45) Date of Patent: Dec. 14, 2010

(54) IRON PIPE FURNITURE ASSEMBLY STRUCTURE

(75) Inventors: Cheng-En Yang, No. 378, Tou Chung Road, Chung Ho Li, Beidou Townshiop, Changhua Hsien (TW); Hsin Chen Yang, Changhua Hsien (TW)

(73) Assignee: Cheng-En Yang

( * ) Notice: Subject to any disclaimer, the term of this patent is extended or adjusted under 35 U.S.C. 154(b) by 334 days.

(21) Appl. No.: 12/068,267

(22) Filed: Feb. 5, 2008

(65) Prior Publication Data
US 2009/0194991 A1    Aug. 6, 2009

(51) Int. Cl.
*A47F 5/14*    (2006.01)
(52) U.S. Cl. .................................................. 211/182
(58) Field of Classification Search .............. 211/182, 211/189; 403/169–178, 187, 201, 255, 262, 403/264, 302, 292–298, 311, 313, 301, 305
See application file for complete search history.

(56) References Cited

U.S. PATENT DOCUMENTS

| | | | |
|---|---|---|---|
| 3,936,111 A * | 2/1976 | Mazzucconi ............. 312/265.4 |
| 4,036,371 A * | 7/1977 | Michel ........................ 211/182 |
| 4,045,104 A * | 8/1977 | Peterson .................. 312/265.4 |
| 4,105,348 A * | 8/1978 | Anderson et al. ........... 403/172 |
| 6,371,313 B1* | 4/2002 | Walter et al. ................. 211/123 |
| 2004/0101354 A1* | 5/2004 | Nakahori et al. ............ 403/169 |
| 2006/0182492 A1* | 8/2006 | Keller ......................... 403/170 |
| 2006/0278777 A1* | 12/2006 | Atkinson et al. ......... 248/188.4 |

\* cited by examiner

*Primary Examiner*—Jennifer E. Novosad
(74) *Attorney, Agent, or Firm*—Bacon & Thomas, PLLC (57) ABSTRACT

An iron pipe furniture assembly structure employs a pipe connector as a connection construction component for connecting a supporting shaft and a pipe element. The assembly utilizes an elongated round-shaped fastening shaft of the pipe connector for connecting the pipe element. The pipe element is connected to the fastening shaft via an insertion cork of the pipe element. Embedded ribs on the insertion cork engage embedded grooves on the fastening shaft to secure the pipe element to the pipe connector. A tool engages a groove in the pipe element to rotate the pipe element to cause the embedded ribs to engage and disengage with the embedded grooves.

6 Claims, 8 Drawing Sheets

IRON PIPE FURNITURE ASSEMBLY STRUCTURE

BACKGROUND OF THE INVENTION

1. Field of the Invention

The present invention relates to an iron pipe furniture assembly structure, and more particularly to a structural design where a pipe connector and the pipe element through a socket construction so that the assembly operation of the pipe element and the pipe connector can be easily and speedily completed with certain simple insertion and spiral actions without using any bolts and nuts for fastening. Not simply easier and faster operation, the absence of bolts and nuts gives it a much nicer looking, thereby resolved the problems and shortcomings of the conventional structure and achieved best utilization value and practicality of the industry.

2. Description of the Related Art

In general, conventional iron pipe furniture usually uses welding to assemble the pipe elements and supporting shafts to form a fixed furniture structure, and because its production requires experience and technical skill of workers to ensure its assembly and production quality and transportation problem caused by its fixed bulk size made it gradually being eliminated by the market and replaced by consumer DIY assembly iron pipe furniture.

Structurally the conventional iron pipe assembly furniture principally uses pipe joints for assembly of the pipe elements and the supporting shafts to form a base rack for the iron pipe furniture, and through installation of the loading boards or panel boards thus completed assembly of the iron pipe furniture; and since the pipe joints, pipe elements and supporting racks all use screws that can be disassembled or that after assembly are fastened by bolts and nuts and hence it is unnecessary to complete assembly of the entire structure before shipping which subsequently reduced packing sizes and transportation cost and consumers only need to follow instructions in the manual to complete fastening operation with pipe joints, pipe elements and supporting shafts and is therefore very convenient.

However, such assembly iron pipe furniture requires using non-technical fastening method for assembly fitting and the entire production process is rather complicated and time-consuming, particularly the screws and bolts are small accessories and is usually packed in a bag as an attachment to the main parts and is rather troublesome and inconvenient, besides frequent shortage of screws and bolts is another problem causing consumers fail to complete assembly and have to resort to buying replacements and is a perennial problem in the assembly of such iron pipe furniture and has to find ways to make improvement.

SUMMARY OF THE INVENTION

In view of the aforementioned shortcoming of the prior art, the inventor of the present invention has started research to find solutions to the problems and shortcomings and because of his long years of experience and technology in the related industry the inventor eventually invented this iron pipe furniture assembly structure which principally provides a fastening operation that does not need screws and bolts therefore made it unnecessary to pack such accessories in a bag as an attachment and at the same time made the assembly operation more convenient and time-saving.

Another purpose of this invention is to design an assembly structure so that the furniture can be easily and speedily assembled through certain simple insertions and spiral turning actions to complete connection of the pipe elements and pipe connectors.

Another purpose of this invention lies in its structural design that no screws and bolts are required for fastening the pipe elements and pipe connectors in assembly so that the entire appearance of the furniture looks nicer because no screws and bolts are being used.

To this end, the structural design of this invention principally lies in an elongated round-shaped fastening shaft in the insertion hollow for assembly of the pipe connector and the pipe element and at one end of the pipe element is a socket set and correspondingly a diamond-round shaped insertion hole so that the long diameter of the insertion hole is slightly larger than the diameter of the fastening shaft and the short diameter of the insertion hole is slightly shorter than the diameter of the fastening shaft and the socket corresponding to the long diameter of the insertion hole is open with a slot so that the socket corresponding to the short diameter against the pressing slab has sufficient room for movement, and at the same time near the end of the pipe element has an indent groove for positioning the socket and the pipe element and enable the tool to operate the pipe element with spiral turning actions so that the assembly and connection operation of the pipe element and the pipe connector can easily and speedily be accomplished with simple insertions and spiral turning actions and that no screws and bolts are used for fastening, thus operation is simpler and speedier and outwardly nicer looking because no screws and bolts are used, thereby achieving best utilization values and practicality of the industry.

DETAILED DESCRIPTION OF THE PREFERRED EMBODIMENTS

Figure 1:
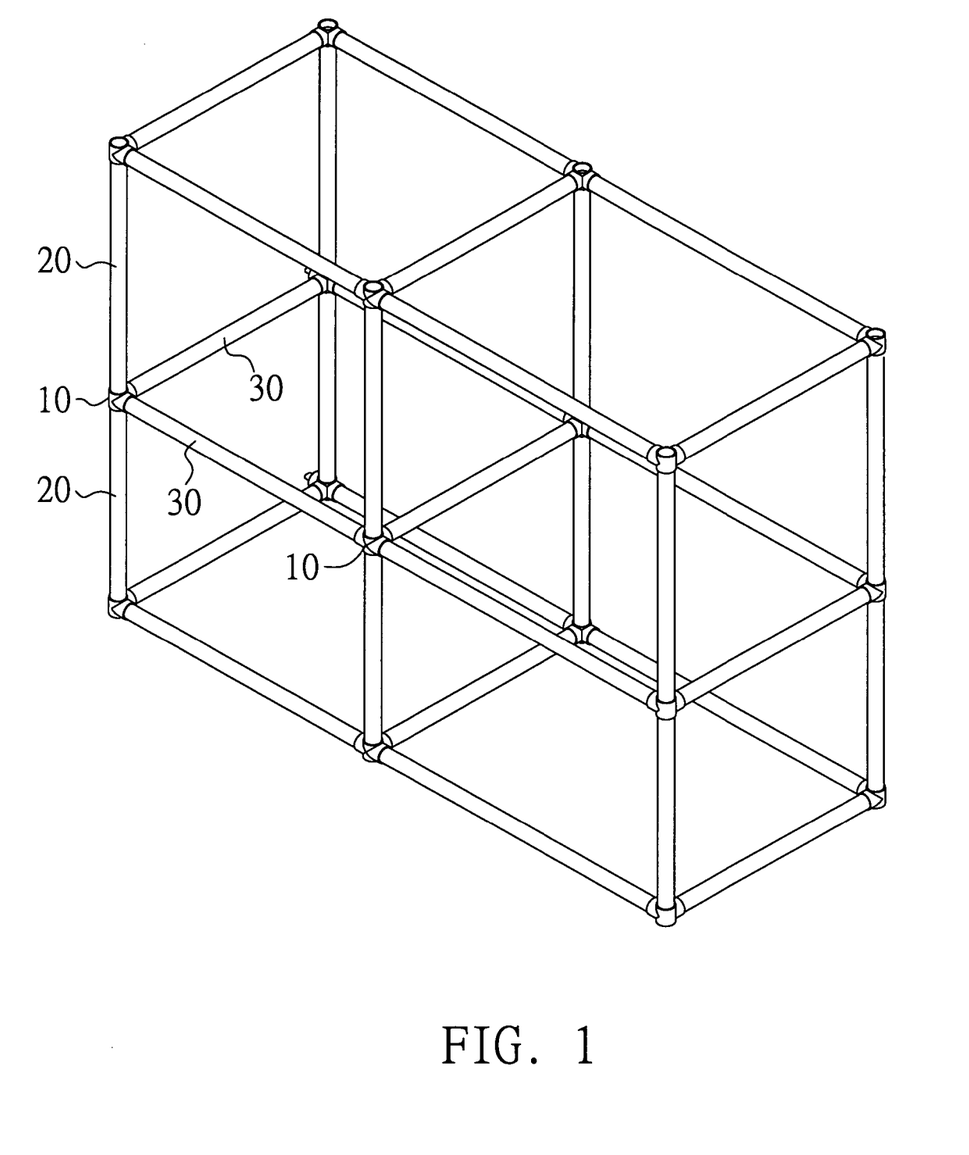
FIG. 1 is a schematic view of a structure of the preferred embodiment of the present invention.
Figure 2:
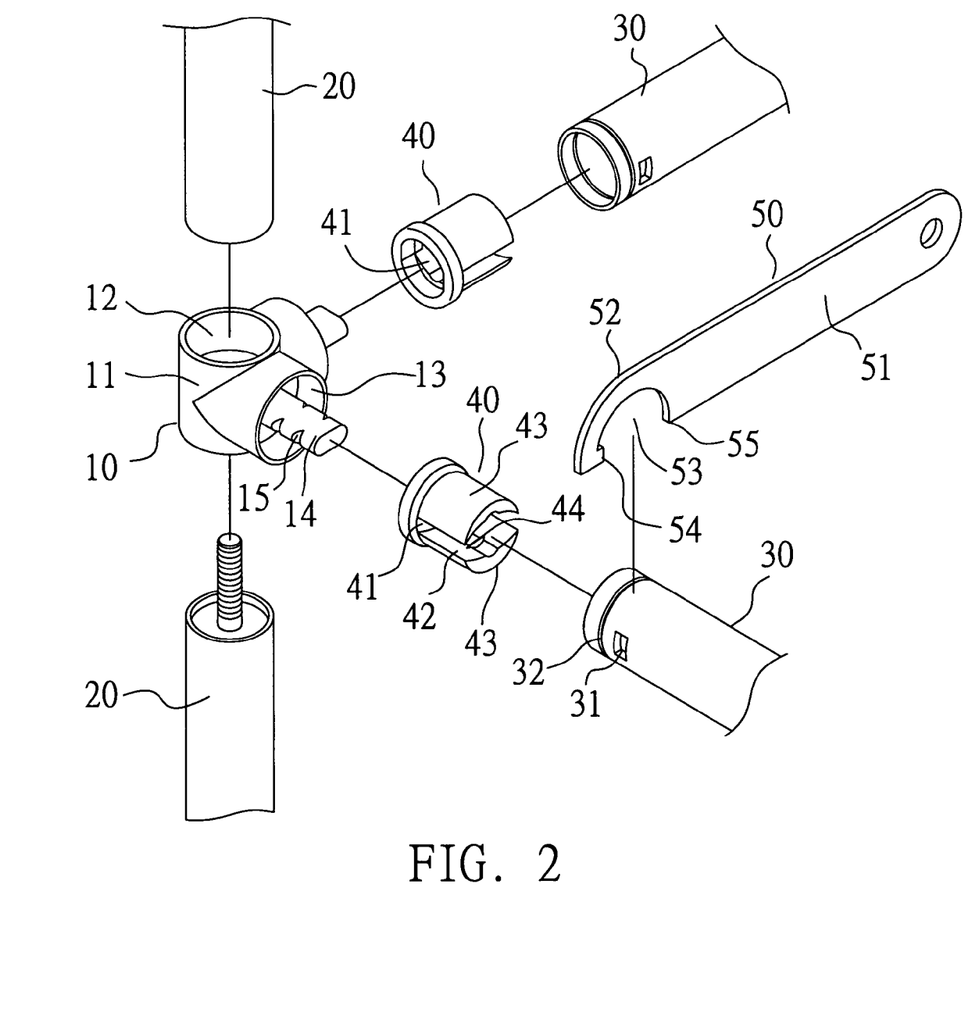
FIG. 2 is a schematic view of a breakdown structure of the preferred embodiment of the present invention.
Figure 3:
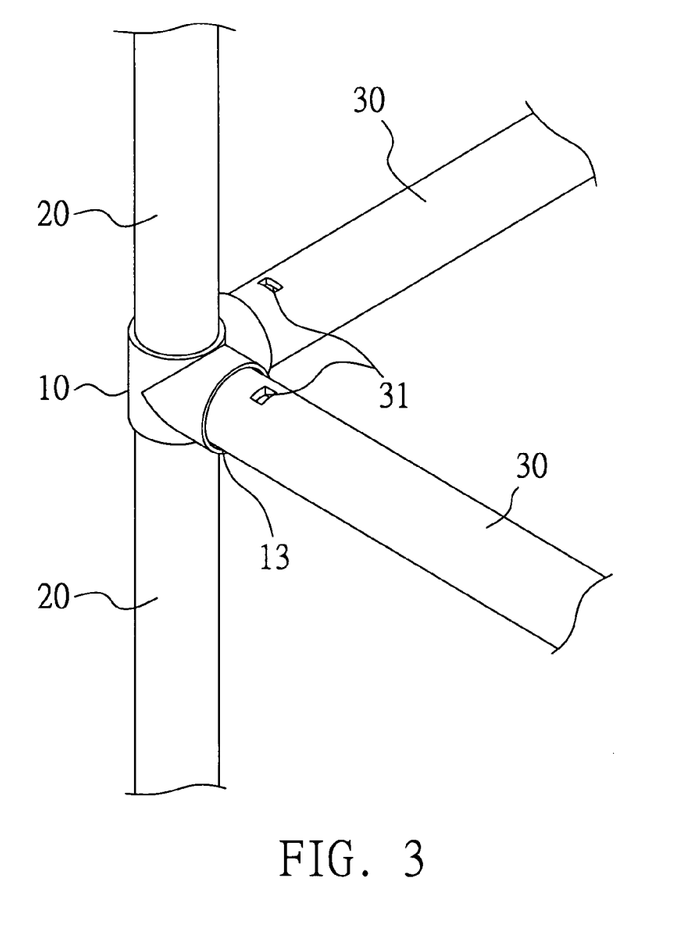
FIG. 3 is a schematic view of the breakdown assembly of the preferred embodiment of the present invention.
Figure 4:
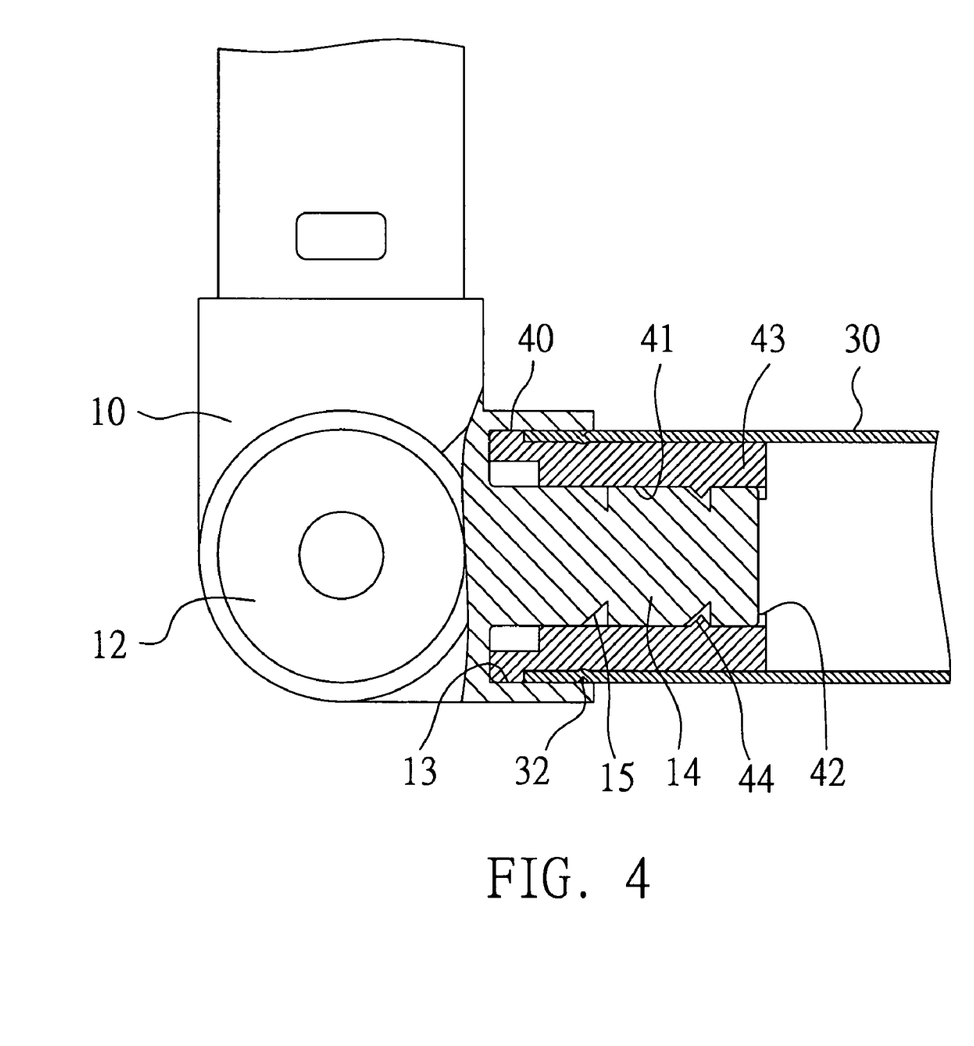
FIG. 4 is a schematic view of the breakdown structural relation of the preferred embodiment of the present invention.
Figure 5:
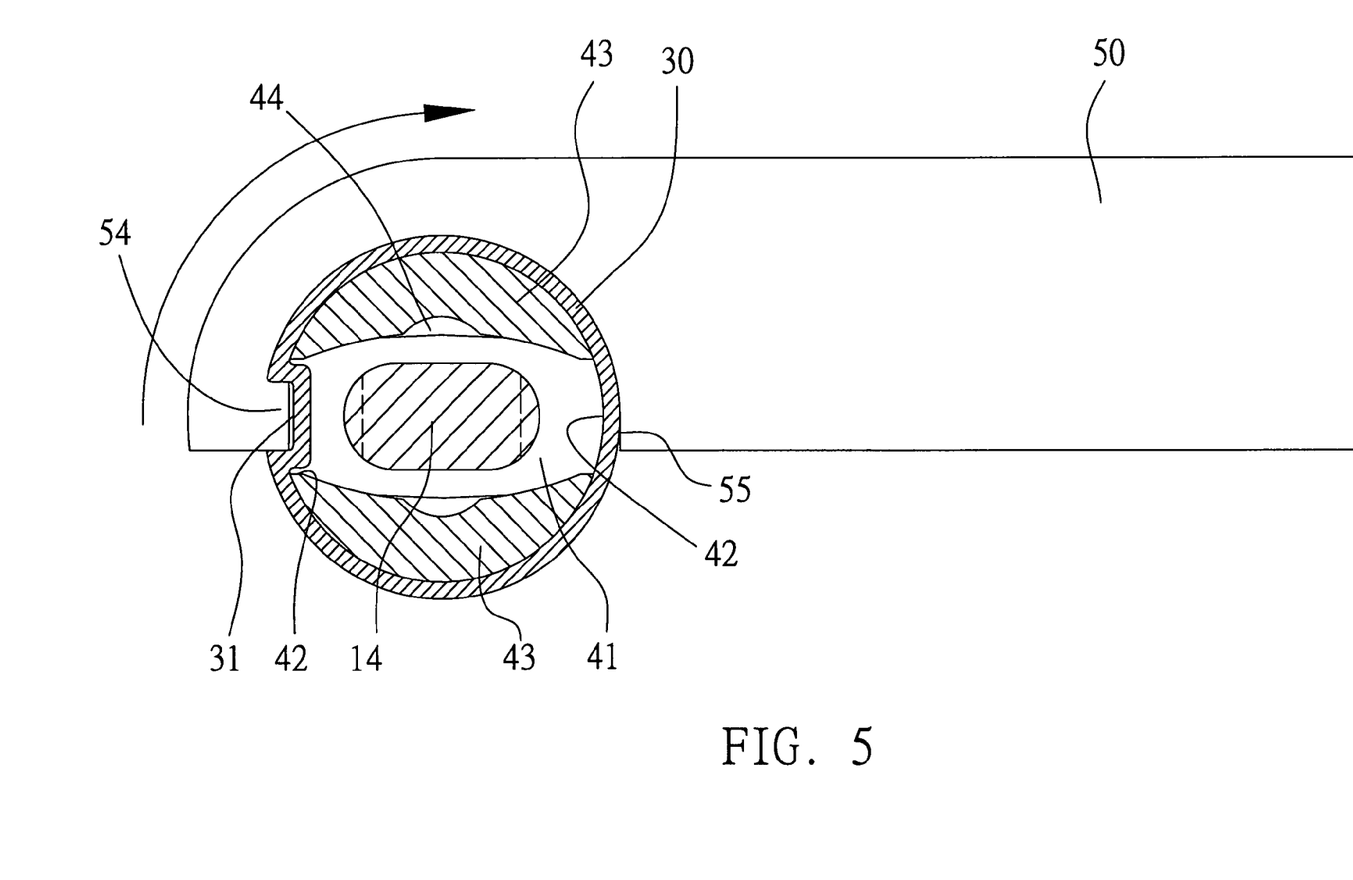
FIG. 5 is a schematic view of the breakdown structure of a non-positioned status of the preferred embodiment of the present invention.
Figure 6:
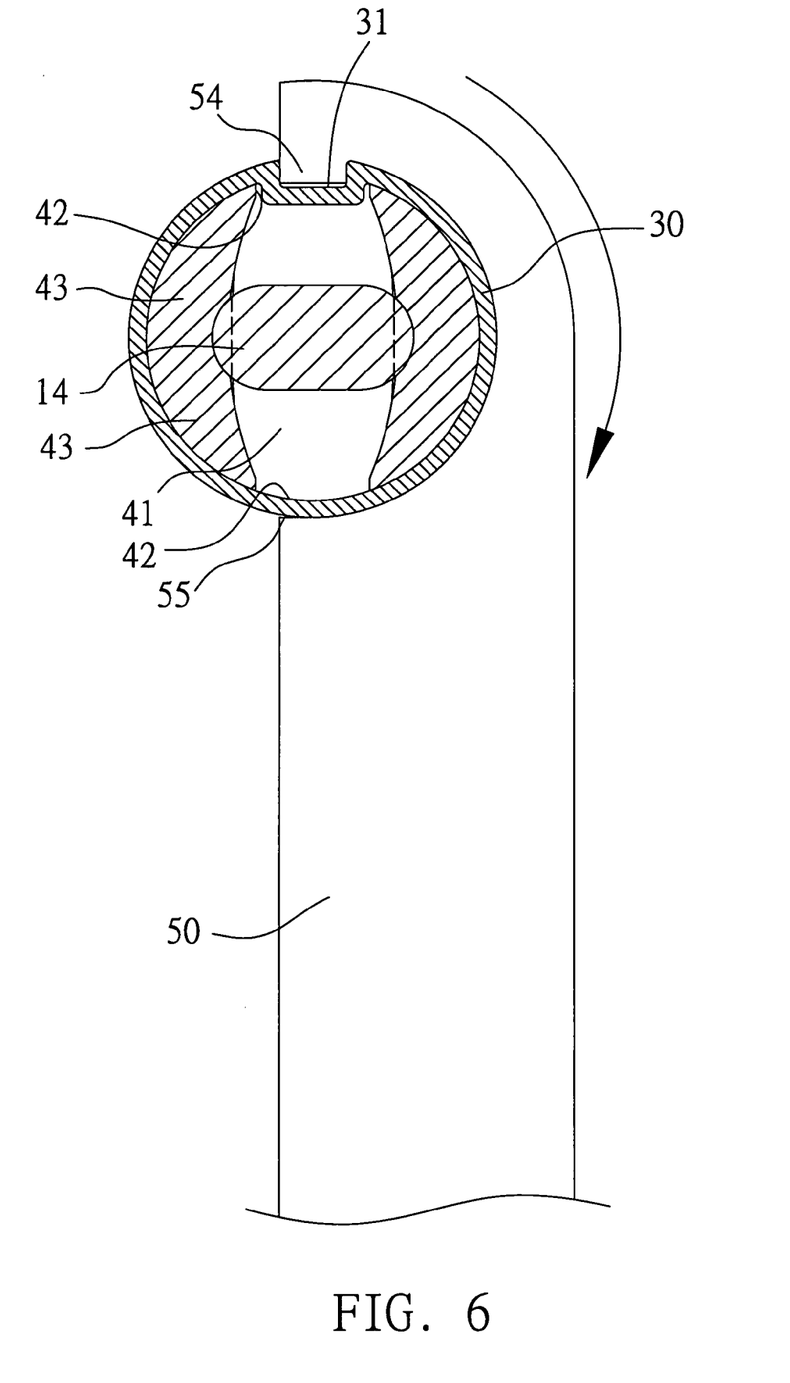
FIG. 6 is a schematic view of the breakdown structure of a positioned status of the preferred embodiment of the present invention.

The preferred embodiment below further explains the structural assembly, technical skills and performance of this invention:

Referring to FIG. 1 of a schematic view of the structure, FIG. 2 of a schematic view of the breakdown of the structure, FIG. 3 of a schematic view of the breakdown of the structural assembly and FIGS. 4~6 of schematic views of the breakdown of the structural relation of the preferred embodiment of this invention; as shown in the diagrams the structural design of this invention lies mainly in using a pipe connector 10 as the connecting element for the supporting shaft 20 and the pipe element 30 in forming a basic framework of the iron pipe furniture and coupled with the loading board 21 or the panel board to complete the entire assembly of the iron pipe furniture, wherein the pipe connector 10 has a bidirectional L-shaped and a tridirectional T-shaped types and the base portion 11 has upper and lower openings with vertical insertion holes 12 for connecting the supporting shaft 20 and in line with requirement of the connecting pipe element 30 a horizontal insertion hole 13 is designed and the horizontal insertion hole 13 is in a vertical relation and at the same time in the center of the insertion hole is an elongated round-shaped fastening shaft 14 where the lateral short side has a number of inverted embedded grooves 15 and utilizing the fastening shaft 14 for insertion of the pipe element 30 and achieve a positioning performance.

The pipe element 30 is a hollow pipe body with appropriate length and near the end of the pipe element 30 is an embedded ring groove 32 for stable embedding of an insertion cork 40 and the insertion cork 40 should better be made of plastic injection molding and at the center of the insertion cork 40 is a diamond-round-shaped insertion hole 41 where the long diameter of the insertion hole 41 is slightly larger than the diameter of the fastening shaft 14 of the aforementioned pipe connector 10 while the short diameter of the insertion hole 41 is slightly shorter than the diameter of the fastening shaft 14 and the interface of the long and short diameter of the insertion hole 41 is designed in a slant mode and the insertion cork 40 corresponding to the long diameter direction of the insertion hole 41 is open with a slot 42 so that the insertion cork 40 corresponding to the short diameter direction of the pressing slab 43 has sufficient room for movement and on the inner side of the pressing slab 43 are a number of embedded ribs 44 while at the same time on one side of the pipe element 30 near the end portion is an indent groove 31 and utilizing the inwardly protruded shape of the embedded ring groove 32 and the embedded ring groove 32 of the insertion cork 40 will be embedded into the slot 42 of the insertion cork 40 when latter is being connected to the end portion of the pipe element 30 so that the restricted position of the insertion cork 40 and the pipe element 30 will remain in an insertion relationship and at the same time achieved a linking relation between the insertion cork 40 and the pipe element 30.

Again, the indent groove 31 near the end portion of the pipe element 30 also provides the tool 50 to operate the spiral turning action of the pipe element 30 and the insertion cork 40 whereas the tool 50 mainly has a handle portion 51 for the hand to exert force and at one end of the handle 51 is a hook portion 52 designed with a clamp mouth 53 for clamping the pipe element 30 and at one end of the clamp mouth 53 is a hook 54 for pressing against the indent groove 31 of the pipe element and at the other end of the clamp mouth 53 is a chin portion for clamping against the outer surface of the pipe element 30 so that using the tool 50 to clamp the pipe element 30 can easily operate the spiral turning action.

That is, with above structural design the connection and assembly operation of the pipe element 30 and the pipe connector 10 of this preferred embodiment of this invention the operator needs only to align the long diameter direction of the insertion cork 40 of the pipe element 30 directly facing the fastening shaft 40 of the pipe element 30 and insert into the insertion hole 13 of the pipe connector 10 and then use the tool 50 to clamp the pipe element 30 and operate the pipe element 30 to turn so that the insertion cork 40 in connection with the end portion of the pipe element 30 and change the corresponding relation between the insertion cork 40 and the fastening shaft 14 so that the short diameter direction of the insertion hole 41 of the insertion cork 40 aligns with the long diameter direction of the fastening shaft 14 and in accommodation with the design of the short diameter direction of the insertion hole 41 of the insertion cork 40 slightly shorter than the long diameter direction of the fastening shaft 14 so that the short direction extended pressing slab 43 of the insertion cork 40 slightly extends outward because of the pressing action from the fastening shaft 14 and resulted in a tight contact positioning action on the inner wall of the pipe element 30 and at the same time enabled the embedded groove 15 on the lateral short side diameter of the fastening shaft 14 further embedded with the embedded ribs 44 on the inner side of the pressing slab 43 of the insertion cork 40 to prevent skidding, and thus through the interface action of the insertion cork 40 with the pipe element 30 and accomplished a stable connection relation with the pipe connector 20 and thereby accomplished the firm stable connection function between the pipe element 30 and the pipe connector 10 with simple insertion and spiral turning actions.

And to disassemble the pipe element 30 with the pipe connector 10 simply use the tool 50 to clamp the pipe element 30 and make spiral turns to turn the insertion cork 40 in connection with the end portion of the pipe element and change the corresponding relation with the fastening shaft 14 of the pipe connector 10 so that the long diameter direction of the insertion hole 41 of the insertion cork 40 correspond with the long diameter direction of the fastening shaft 14 and easily release the pipe element 30 from the insertion groove 13 of the pipe connector 10 and easily disassemble the pipe element 30 from the pipe connector 10.

Figure 7:
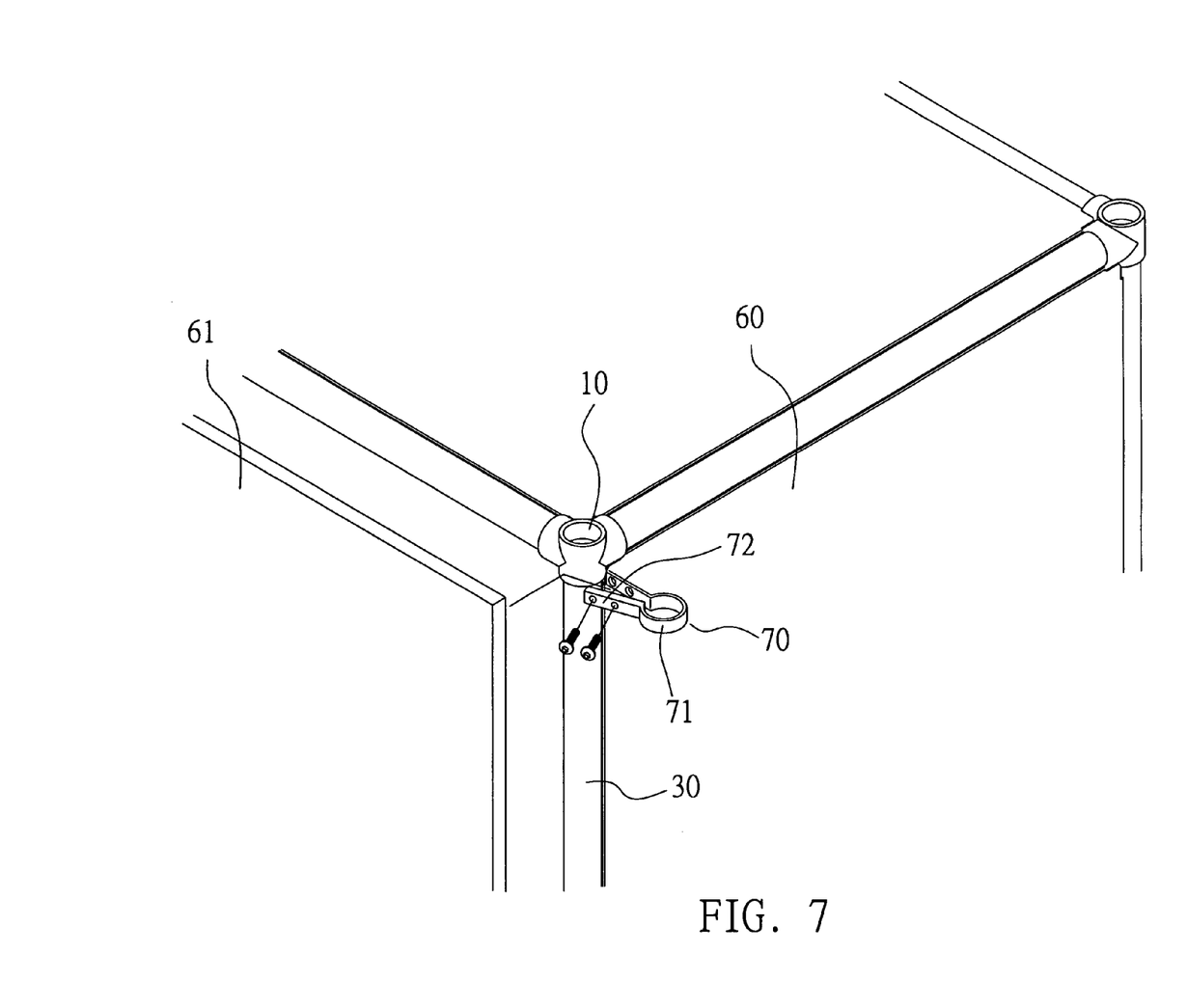
FIG. 7 is a schematic view of the structure of another preferred embodiment of the present invention.
Figure 8:
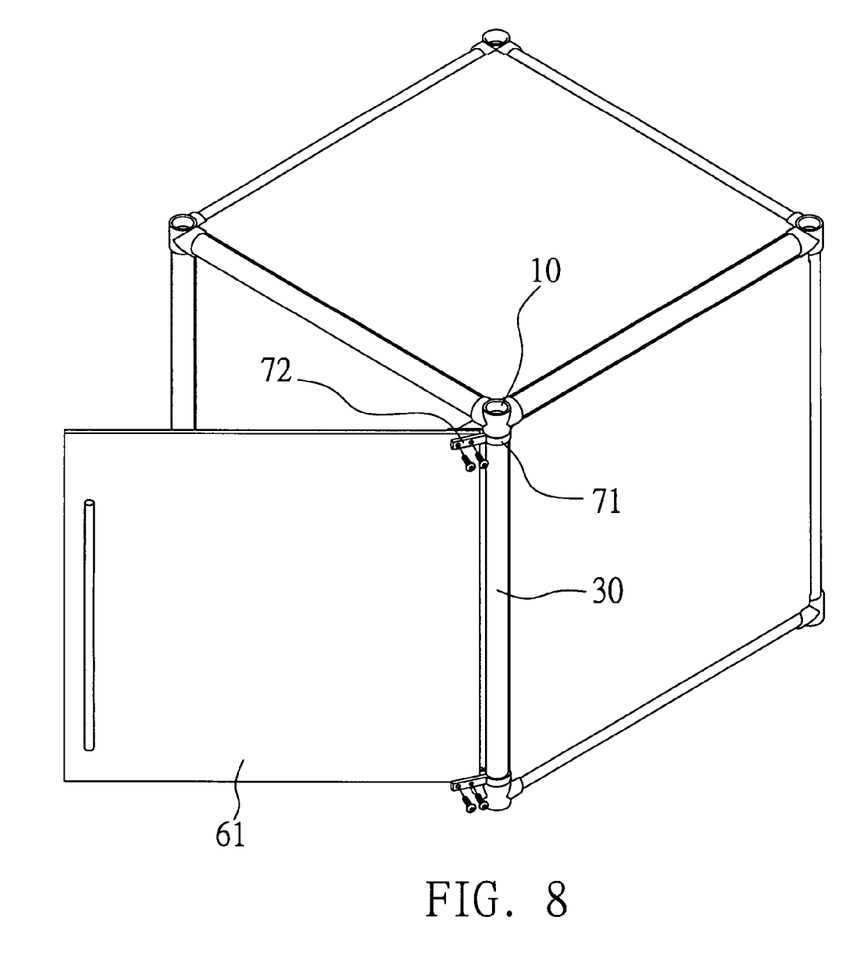
FIG. 8 is a schematic view of the structure with the panel board in open status of another preferred embodiment of the present invention.

Furthermore, referring to FIGS. 7 and 8 for schematic views of the preferred embodiment of this invention, as shown in the diagrams, principally uses the aforementioned pipe element 30 and the pipe connector 10 with the lateral panel boards 60 to form cabinets and using the clamp clip 70 to clamp the upper and lower portions of the pipe element 30 and the ring portion 71 at the rear end after assembly with the pipe element 30 forms a movable hinge and using the clipping slabs of the front end to fasten the door panel 61 enables the door panel 61 to open laterally to facilitate placing and retrieving articles and thereby constitutes another preferred embodiment of this invention.

Thus we can see that this invention has discarded the conventional way of using screws and bolts for fastening the pipe element and the pipe connector of the iron pipe furniture and instead uses an elongated round-shaped fastening shaft in the insertion hole of the pipe connector and together with the insertion hole of the insertion cork at the end portion of the pipe element to enable the turning of the pipe element to change the corresponding relation between the insertion hole of the insertion cork and the fastening shaft and thus decide the positioning or release relation between the pipe element and the pipe connector to meet requirements of assembly or disassembly, in other words, with the innovative structural design of this invention the assembly or disassembly of the iron pipe furniture can be easily positioned or released with certain simple turning actions so that assembly or disassembly can both be conveniently carried out and in contrast to the time-consuming and troublesome conventional fastening structure and often shortages of accessories it is of more utilization values and practicality of the industry.

In summation of the description above, the innovative design of this invention for the iron pipe furniture by utilizing the elongated round-shaped fastening shaft of the pipe connector with the insertion hole of the insertion cork of the pipe element at the end portion has enabled simple insertions and spiral turning actions to speedily complete connection and assembly of the pipe element and the pipe connector and eliminated the many problems and shortcomings of using conventional fastening or fastening structure; overall this superior innovative design is of best utilization values and practicality of the industry and is therefore duly filed for patent application in accordance with the law.

What is claimed is:

1. A pipe furniture assembly structure, comprising:
   a supporting shaft, the supporting shaft being elongate and forming a structural member of the pipe furniture assembly structure;
   a pipe element forming a hollow pipe body;
   an insertion cork for insertion into the hollow pipe body, a diamond-round-shaped insertion hole formed in the insertion cork, a slot being formed in the insertion cork such that the slot divides a pressing slab of the insertion cork into first and second pressing slab portions, at least one rib being formed on an inner surface of the pressing slab;
   a pipe connector having a vertical insertion hole for receiving the supporting shaft, the pipe connector having a horizontal connection hole for receiving the insertion cork and the pipe element; and
   an elongate fastening shaft extending from the horizontal insertion hole, the fastening shaft having at least one groove formed on a side portion of the fastening shaft for selective engagement with the at least one rib on the pressing slab for securing the pipe element to the pipe connector,
   wherein the fastening shaft is inserted into the insertion hole of the insertion cork, and upon rotation of the pipe element with respect to the pipe connector the at least one rib selectively engages and disengages the at least one groove to selectively secure the pipe element to the pipe connector.

2. The pipe furniture assembly structure according to claim 1, wherein the pipe element has an indent groove formed in the pipe body adjacent an end portion of the pipe element, and a tool is used to engage the indent groove for rotating the pipe element.

3. The pipe furniture assembly structure according to claim 2, wherein the tool includes a handle at a first end portion and a hook portion at a second end portion of the tool, the hook portion including a clamp mouth for clamping the pipe element and a hook for engaging the indent groove.

4. The pipe furniture assembly structure according to claim 1, wherein the pipe element includes an inner protruded ring groove adjacent the end portion of the pipe element for abutting the insertion cork to secure the insertion cork to the pipe element.

5. The pipe furniture assembly structure according to claim 1, wherein the insertion cork is injection molded from plastic materials.

6. The pipe furniture assembly structure according to claim 1, wherein the pipe element includes upper and lower clamping clips for connecting door panels to the pipe element, the rear of the clamping clips having a ring portion functioning as a hinge with the piper element, and the clamping clips being extended to clamp and fasten the door panel.

* * * * *